(12) United States Patent
Cha

(10) Patent No.: US 9,253,465 B2
(45) Date of Patent: Feb. 2, 2016

(54) METHOD OF DISPLAYING RECORDED MATERIAL AND DISPLAY DEVICE USING THE SAME

(71) Applicant: LG ELECTRONICS INC., Seoul (KR)

(72) Inventor: Youn Jine Cha, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/898,948

(22) Filed: May 21, 2013

(65) Prior Publication Data

US 2013/0251335 A1 Sep. 26, 2013

Related U.S. Application Data

(63) Continuation of application No. 12/675,568, filed as application No. PCT/KR2007/006891 on Dec. 27, 2007.

(30) Foreign Application Priority Data

Aug. 29, 2007 (KR) ........................ 10-2007-0087158

(51) Int. Cl.
*G06F 3/048* (2013.01)
*H04N 9/87* (2006.01)
(Continued)

(52) U.S. Cl.
CPC ................ *H04N 9/87* (2013.01); *G11B 27/105* (2013.01); *G11B 27/329* (2013.01); *G11B 27/34* (2013.01);
(Continued)

(58) Field of Classification Search
CPC .......... G06F 17/3079; G06F 17/30796; G06F 17/30817; G06F 17/30843; G06F 17/30787; G06F 17/30828; G06F 17/30852; G06F 3/0482; G06F 2203/04806; G06F 2203/04808; G06F 3/0485; G06F 3/04855; G06F 3/04883; G06F 3/04817
See application file for complete search history.

(56) References Cited

U.S. PATENT DOCUMENTS 5,956,094 A 9/1999 Chun .............................. 348/564
8,112,711 B2 * 2/2012 Ackley ........................... 715/716
(Continued)

FOREIGN PATENT DOCUMENTS

EP 0 838 766 A2 4/1998
EP 1 515 552 A1 3/2005
(Continued)

OTHER PUBLICATIONS

International Search Report dated Jun. 9, 2008 issued in Application No. PCT/KR2007/006891.
(Continued)

*Primary Examiner* — William Bashore
*Assistant Examiner* — Rayeez Chowdhury
(74) *Attorney, Agent, or Firm* — Ked & Associates, LLP

(57) ABSTRACT

A method of displaying a recorded material and display device using the same facilitates user recognition of the content of selected recorded material prior to its reproduction. The display device includes a personal video recorder for storing content of at least one recording item of a recording item list; a PVR controller (104) for extracting a plurality of thumbnails corresponding to each stored recorded item, each thumbnails being extracted in correspondence to a prescribed time interval; and a display module (106) for displaying the recording item list in response to a recording item list request and for simultaneously displaying, in response to a user selection of a specific recording item, the extracted thumbnails corresponding to the selected recording item via a corresponding plurality of preview windows. A specific preview window is designated, and the selected recording item is reproduced from a recording position corresponding to the thumbnail of the designated window.

18 Claims, 7 Drawing Sheets

(51) Int. Cl.
*G11B 27/10* (2006.01)
*G11B 27/32* (2006.01)
*G11B 27/34* (2006.01)
*H04N 5/445* (2011.01)
*H04N 5/76* (2006.01)
*H04N 21/4147* (2011.01)
*H04N 21/431* (2011.01)
*H04N 21/432* (2011.01)
*H04N 21/4402* (2011.01)
*H04N 21/472* (2011.01)
*H04N 21/81* (2011.01)
*H04N 21/845* (2011.01)
*H04N 5/781* (2006.01)

(52) U.S. Cl.
CPC ....... *H04N 5/44513* (2013.01); *H04N 5/44591* (2013.01); *H04N 5/76* (2013.01); *H04N 21/4147* (2013.01); *H04N 21/4312* (2013.01); *H04N 21/4325* (2013.01); *H04N 21/440263* (2013.01); *H04N 21/440281* (2013.01); *H04N 21/47217* (2013.01); *H04N 21/8153* (2013.01); *H04N 21/8455* (2013.01); *H04N 5/781* (2013.01)

(56) References Cited

U.S. PATENT DOCUMENTS

| | | | |
|---|---|---|---|
| 2002/0027562 A1* | 3/2002 | Kimble et al. | 345/629 |
| 2002/0056123 A1* | 5/2002 | Liwerant et al. | 725/87 |
| 2002/0112226 A1* | 8/2002 | Brodersen et al. | 717/140 |
| 2003/0033502 A1 | 2/2003 | Matsuzaki | 712/200 |
| 2003/0108330 A1 | 6/2003 | Jo | 386/70 |
| 2003/0184598 A1* | 10/2003 | Graham | 345/838 |
| 2004/0221322 A1 | 11/2004 | Shen et al. | 725/135 |
| 2005/0010955 A1* | 1/2005 | Elia et al. | 725/88 |
| 2005/0089303 A1 | 4/2005 | Kim et al. | 386/46 |
| 2005/0091597 A1* | 4/2005 | Ackley | 715/716 |
| 2006/0044216 A1 | 3/2006 | Love | 345/1.3 |
| 2006/0064716 A1 | 3/2006 | Sull et al. | 725/37 |
| 2006/0110128 A1 | 5/2006 | Dunton et al. | 386/52 |
| 2006/0132503 A1* | 6/2006 | Makela | 345/629 |
| 2006/0222325 A1 | 10/2006 | Ellis | 386/83 |
| 2006/0230356 A1* | 10/2006 | Sauve et al. | 715/777 |
| 2006/0259943 A1 | 11/2006 | Kimura | 725/134 |
| 2006/0288389 A1* | 12/2006 | Deutscher et al. | 725/88 |
| 2007/0031115 A1 | 2/2007 | Oshikiri et al. | 386/95 |
| 2007/0206923 A1* | 9/2007 | Murakoshi et al. | 386/95 |
| 2008/0034325 A1* | 2/2008 | Ording | 715/838 |
| 2009/0058822 A1* | 3/2009 | Chaudhri | 345/173 |
| 2009/0115901 A1* | 5/2009 | Winter et al. | 348/565 |
| 2009/0222730 A1 | 9/2009 | Wixson et al. | 715/723 |
| 2010/0119207 A1 | 5/2010 | Hwang | 386/69 |
| 2011/0107220 A1* | 5/2011 | Perlman | 715/720 |
| 2011/0161818 A1* | 6/2011 | Viljamaa | 715/720 |

FOREIGN PATENT DOCUMENTS

| | | |
|---|---|---|
| EP | 1 806 920 A1 | 7/2007 |
| JP | 2000-187760 A | 7/2000 |
| JP | 2000-209541 A | 7/2000 |
| JP | 2004-072132 A | 3/2004 |
| JP | 2006-121399 A | 5/2006 |
| JP | 2006-186617 A | 7/2006 |
| JP | 2007-134010 A | 5/2007 |
| KR | 10-2007-0058927 A1 | 6/2007 |
| KR | 10-2007-0075728 A | 7/2007 |
| KR | 10-2007-0075731 A | 7/2007 |

OTHER PUBLICATIONS

European Search Report dated Oct. 26, 2010 issued in Application No. 07 86 0691.
United States Office Action dated Oct. 3, 2012 issued in U.S. Appl. No. 12/675,568.
United States Final Office Action dated Apr. 17, 2013 issued in U.S. Appl. No. 12/675,568.

* cited by examiner

METHOD OF DISPLAYING RECORDED MATERIAL AND DISPLAY DEVICE USING THE SAME

CROSS-REFERENCE TO RELATED APPLICATIONS

This application is a Continuation Application of prior U.S. patent application Ser. No. 12/675,568 filed Jun. 10, 2010, which is a National Stage application under 35 U.S.C. §365 of International Application No. PCT/KR2007/006891 filed on Dec. 27, 2007, which claims priority under 35 U.S.C. §119 to Korean Application No. 10-2007-0087158 filed on Aug. 29, 2009, whose entire disclosures are hereby incorporated by reference.

BACKGROUND

1. Field

The present invention relates to display devices, and more particularly, to a method of displaying recorded material and a display device using the same.

2. Background

A contemporary display device, such as a television receiver provided with a personal video recorder (PVR), enables the storage (i.e., recording) and playback (i.e., reproduction) of received signals, e.g., received television broadcasts and other video-based content, according to a user selection from a recording item list, which may be displayed using on-screen display (OSD) data. Such a recording item list can be viewed as an OSD menu including selectable icons, for example, in the form of titles and/or thumbnails, providing a user with means to designate for playback a specific recording item of the list.

Meanwhile, the display device may be further provided with a limited preview mode enabling a user to recognize content of a designated (highlighted) recording item. A recording item is typically designated by manipulating a curser to navigate the displayed recording item list, for example, to select a specific recording item for playback. In the preview mode, a thumbnail or other sample image corresponding to each menu item (e.g., title) may be displayed via a corresponding preview window. That is, the OSD menu of the recording item list uses a single preview window to display a sample image of the corresponding recording item when highlighted for playback execution.

For improved user recognition of the selected recording item, the single preview window may display more than one such thumbnail or sample image. For example, a plurality of thumbnails may appear in the preview window through the use of a type of a revolving display, where a predetermined viewing time period is allotted for each thumbnail before the next thumbnail is likewise displayed for a similar time period. In other words, prior to playback execution, a single preview window may display a predetermined set of sample images, one by one, in correspondence to any selected one of the recording items. Such a revolving display may be initiated for a default menu item (e.g., the latest recording item) in the absence of a user selection from the recording item list or upon such recording item selection by the user.

In a contemporary display device as described above, however, a user has difficulty in recognizing the overall contents of corresponding recorded material at a glance. Also, after selection of a specific recording item for playback, in the event that there may be a favorite or otherwise specially desired portion of the selected recording item, it may take the user considerable time to search for a corresponding recording point enabling more immediate playback.

Accordingly, the present invention is directed to a method of displaying recorded material and display apparatus using the same that substantially obviates one or more problems due to limitations and disadvantages of the related art.

An object of the present invention is to provide a method of displaying recorded material and display apparatus using the same, which facilitates user recognition of the contents of selected recorded material prior to its reproduction (playback).

Another object of the present invention is to provide a method of displaying recorded material and display apparatus using the same, which facilitates user recognition of the contents of all recorded material available for reproduction (playback).

Another object of the present invention is to provide a method of displaying recorded material and display apparatus using the same, which facilitates the recognition and designation for playback of a specific recording position of recorded material selected (designated) by a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a method of displaying recorded material in a display device. The method comprises displaying a recording item list having a plurality of recording items; and simultaneously displaying, in response to a user selection of a specific recording item, a plurality of sample images corresponding to the selected recording item via a corresponding plurality of preview windows.

According to another aspect of the present invention, there is provided a display device comprising a personal video recorder (PVR) unit for storing content of at least one recording item of a recording item list; a PVR controller for extracting a plurality of sample images corresponding to each stored recording item; and a display module including a screen for displaying the recording item list in response to a recording item list request and for simultaneously displaying, in response to a user selection of a specific recording item, the extracted sample images corresponding to the selected recording item via a corresponding plurality of preview windows.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principles of the invention. In the drawings.

DETAILED DESCRIPTION

Best Mode for Carrying Out the Invention

According to the present invention, a plurality of preview windows for a single item of a recording item list is employed, for example, as part of an OSD menu. The preview windows of the present invention occupy adjacent areas of the same screen and respectively display N sample images (e.g., thumbnails) of one selected recording item in association with another identifying feature (e.g., a program title) of the selected item. By thus displaying the plurality of sample images simultaneously, a user is able to recognize the overall contents of recorded material at a glance and may be further provided with time information corresponding to a position of any one or all of the sample images. In particular, without playing or viewing a selection of recorded material in its entirety, the N sample images of a selected (highlighted) recording item are simultaneously displayed via the N preview windows, respectively. The set of N sample images, which may include still images, thumbnails, or sample moving pictures, may represent equally spaced divisions of an item of the recorded material. For example, the recording length (run time) of a selected recording item may be divided by a number N, i.e., a value set by the user or determined as a default value, where a representative sample image is extracted from the recorded material in correspondence to each interval. Accordingly, a set of sample images may be simultaneously displayed via the plural preview windows, respectively, with time information of each interval being displayed in association with the corresponding sample image.

Figure 1:
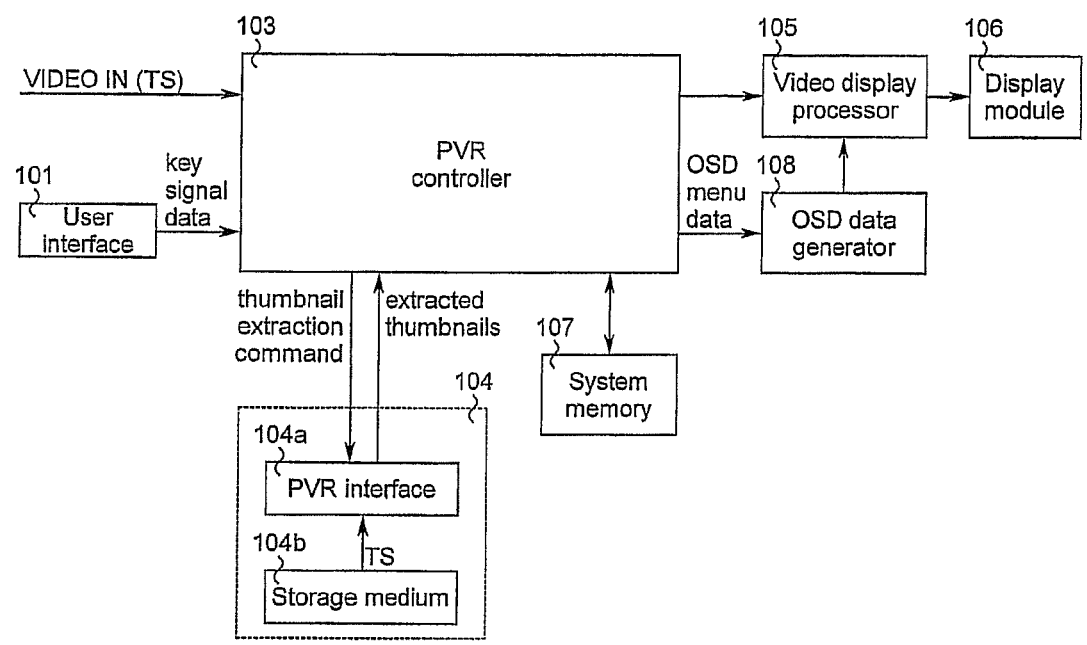
FIG. 1 is a block diagram of a display device according to the present invention.

Referring to FIG. 1, a display device such as a television receiver includes a user interface 101; a personal video recorder (PVR) controller 103 for controlling a PVR unit 104 according to a system program executed by a microcomputer (not shown); a video display processor 105 for processing a video signal including recording item OSD data (menu data) to be displayable via a display module 106, which may be in the form of a cathode ray tube or a flat-panel (e.g., LCD or PDP) display device; a system memory 107 for storing the system program and additional information under control of the microcomputer; and an on-screen display (OSD) data generator 108. The PVR unit 4 includes a PVR interface 104a and a storage medium 104b, such as a hard disc drive, where the PVR interface may be in the form of a system-on-chip device. The user interface 101 comprises a plurality of keys of, for example, a remote or local physical or virtual keypad of the display device, including a recording key for requesting a recording operation to be performed with respect to a received video input signal and a recording item list key for requesting an on-screen display of a recording item list, which is an OSD menu for selecting recorded material for playback. In a display device or television receiver as above, recording item OSD data comprises a configuration of recording item list data (e.g., title information) and a plurality of extracted sample images (e.g., thumbnails) and is displayed as an OSD menu, which may be superposed on, or substituted for, a processed video signal.

Meanwhile, a display device (e.g., a television receiver) according to the present invention, which includes a personal video recorder, is typically configured to receive a video input signal (VIDEO IN) including content to be recorded in the personal video recorder. That is, the display device according to the present invention may be provided with means to receive and record additional video content, i.e., in addition to that which may already be stored in the storage medium 104b. Here, the storage medium 104b of the display device according to the present invention may be provided internally or may be connected externally as an externally disposed or remotely accessible (e.g., via the Internet) storage device. As such, the display device of the present invention may be supplied with video data as a transport stream (TS) output from the storage medium 104b or input to the PVR controller 103 via its video input.

For the video input to a display device of the present invention, an antenna and tuner arrangement (not shown) may be provided to selectively receive terrestrial television broadcast signals and may be further or alternatively provided with an external signal input port (not shown) to receive a video input signal via a cable connection to an external source or service. Such a tuner may be an analog broadcast signal tuner or a digital broadcast signal tuner, and the cable connection signal may likewise correspond to an analog or digital television signal. In addition to broadcast signal reception as above, one or more multimedia peripherals, such as a digital video disc player, videotape recorder, or other external player (not shown), may be variously connected to supply a video input signal according to user requests.

The PVR controller 103 serves as a central processing unit of the display device according the present invention and controls the PVR unit 104 in response to key signal data provided in accordance with user selections. For instance, the PVR controller 103 provides the PVR unit 104 a thumbnail extraction command in response to a key signal from the user interface and according to system programming. In response to the thumbnail extraction command, which is generated in correspondence to a specific recording item, the PVR unit 104 extracts N (N being a positive integer) corresponding thumbnails at a predetermined time interval and provides the extracted thumbnails to the PVR controller 103 for storage in the system memory 107 together with corresponding title and other identifying information of the specific recording item. It should be appreciated that the thumbnail extraction command may be generated in response to a recording key signal or a specific recording item designation. That is, thumbnail extraction and storage may be performed at the time of originally recording (storing) a video input signal in the storage medium 104b or after designating recorded material of a displayed recording item list, i.e., during an instance of menu display.

Subsequently, the PVR controller 103 uses the extracted N thumbnails to configure recording item OSD data corresponding to the recorded material. In doing so, OSD menu data may be configured for the entire contents of the storage medium 104b, namely, recorded video content available to the display device according to the present invention, and is stored in correspondence to each selectable item of a recording item list to be displayed. Thereafter, in the event of a recording item list key signal input from the user interface 101, which is a user operation to request a generation and display of recorded material information, a user selection can be made as desired from a recording item list comprised of the stored recording item OSD data. As such, the requested display of a current recording item list corresponds to entry of a recording item list mode.

In detail, in a recording item list mode selected by a user, a recording item list is displayed on a screen of the display device to provide the user with a visual indication of all recorded material, that is, video content that has been stored in the personal video recorder and is available for playback using the display device. Using, for example, a curser to first highlight one of the recording items, the user may then select any recording item of the list, but if no specific recording item is selected by the user, the display device may simply highlight a latest recording item, i.e., the last or most recently recorded material among the displayed recording items. The display of a recording item list according to the present invention includes a plurality of sample images for at least one item of the list and preferably a set of sample images for all such items.

In the operation of the above-configured display device, a video input signal is stored in the storage medium 104b, enabling recorded material to be played back by the PVR unit 104. Thereafter, if a user selects via the user interface 101a a specific recording item from a displayed recording item list, a key signal for selecting the corresponding recording item is input to the PVR controller 103. In this case, the PVR controller 103 is provided with N thumbnails required for configuring the OSD data of the selected recording item. These thumbnails may be provided from the system memory 107, in accordance with a previous instance of recording item OSD data configuration, or via the PVR interface 104a, i.e., from the storage medium 104b. In the later case, since any display of the N thumbnails of the recording item OSD data requires extraction from the recorded material, there may be some delay in generating the requested recording item list. In any event, the provided thumbnail information is output to the video display processor 105, to be integrated with OSD menu data of a current recording item list and displayed on a screen of the display module 106. In doing so, N thumbnails are displayed via N preview windows, which are collectively arranged with at least one other identifying feature of the selected recording item, for example, its title and/or time information of the thumbnail.

Figure 2:
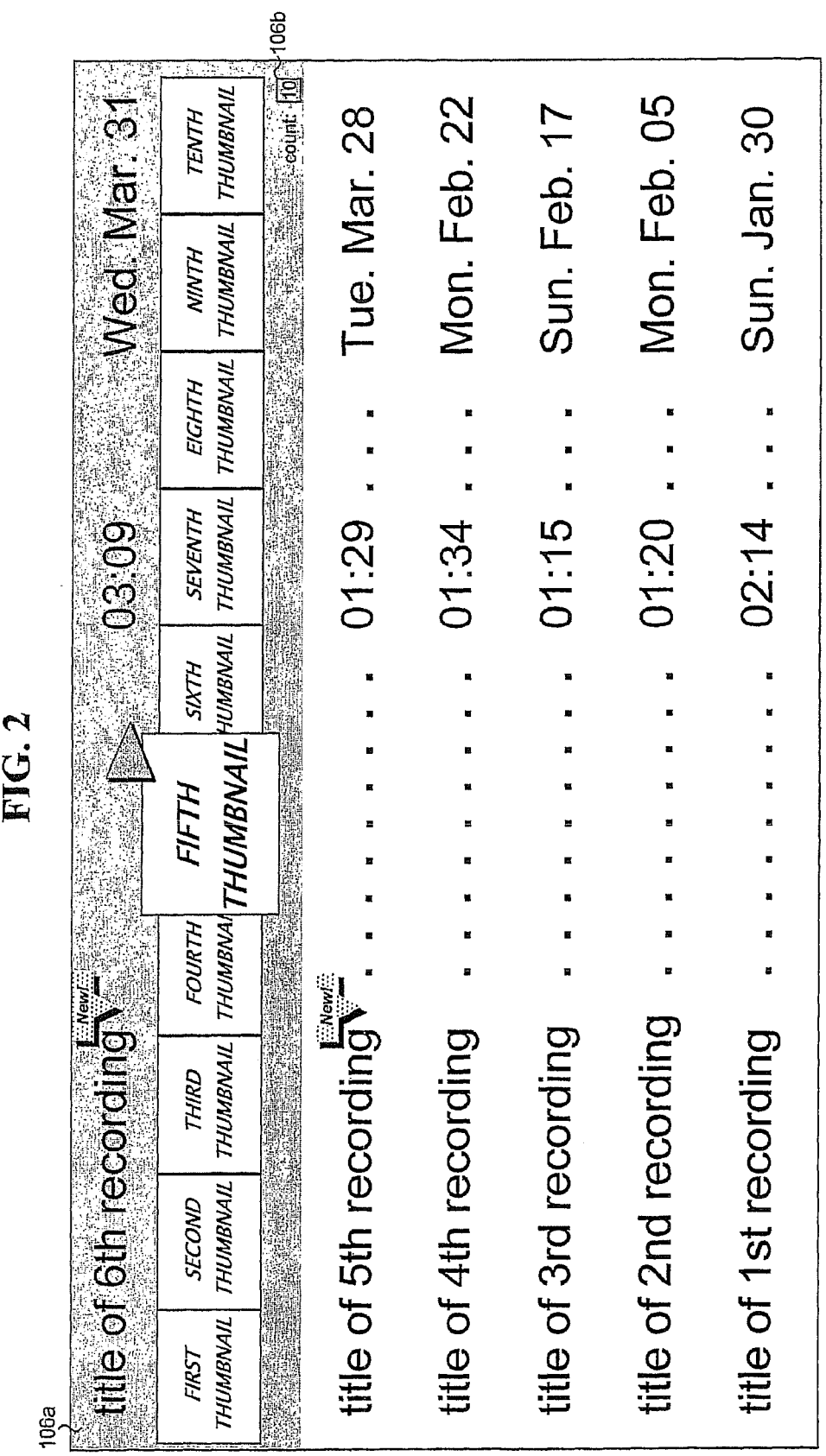
FIG. 2 is a diagram of an exemplary screen image according to the present invention, in which a plurality of thumbnails are simultaneously displayed via a plurality of preview windows in association with a selected recording item.

As shown in FIG. 2, the configured recording item OSD data may include ten sample images or thumbnails (i.e., N=10) stored in correspondence with one or more of a number of recording items. In the example of FIG. 2, in addition to corresponding title information, the recording item OSD data further includes a recording length and date and an icon for marking newly stored programs. With a recording item list thus displayed, if a user selects a specific item from the recording item list, the corresponding N thumbnails are simultaneously displayed on a screen 106a of the display module 106 via N preview windows and may be displayed in association with the title of the selected recording item. Here, the latest recorded material (i.e., "title of 6th recording") is selected, and its title and other identifying features are displayed above a set of horizontally arranged preview windows. It should be appreciated that, in displaying the thumbnails in association with the title information, the title information may appear on any side of or otherwise adjacent to (e.g., above or below or to left or right) the arrangement of thumbnails, and the thumbnails may be arrayed as a row or column on the top, the bottom, or one side of the screen. With the N thumbnails of a specific recording item thus displayed, the user may first glance through the entire displayed set of thumbnails and then select (activate) any one of the N thumbnails, for example, the fifth such thumbnail, to begin reproducing the recorded material from the recording position of the selected thumbnail. In doing so, the corresponding preview window is "popped up." Though not specifically shown in the drawings, the array of extracted thumbnails may extend beyond the breadth of the screen area, in which case a scroll bar may be provided to enable viewing of further thumbnails in cases where the necessary extraction has already been performed or where additional thumbnail extraction is to be performed by varying a preview window count (ten in FIG. 2) while in the recording item list mode. Also, a column-type array of thumbnails may be navigated by up/down keys, and a row-type array of thumbnails may be navigated by left/right keys.

Figure 3:
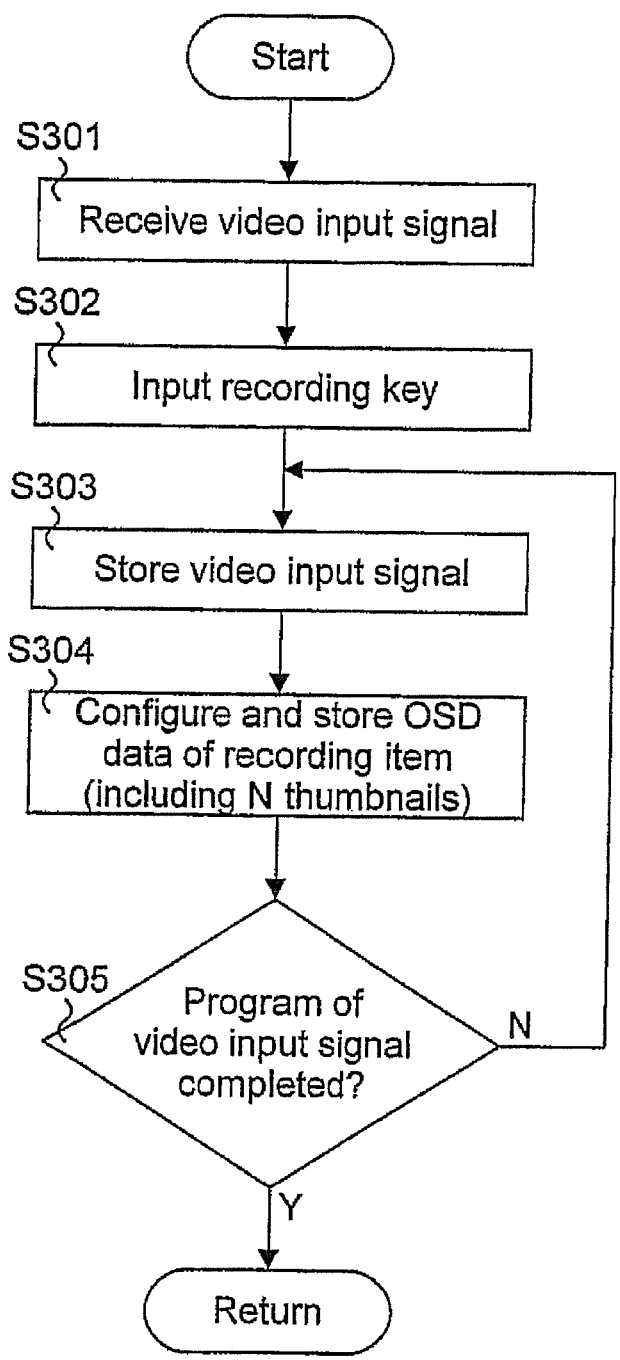
FIG. 3 is a flowchart of a routine for generating and storing recording item OSD data in a display device according to the present invention.

Referring to FIG. 3, illustrating a generation and storage of a recording item list corresponding to recorded material, i.e., during a recording operation, a video input signal, for example, a broadcast program, is received by the display device according to the present invention (S301). With the video input signal thus applied, the system programming of the PVR controller 103 determines whether a recording key signal for storing the received video input signal in the storage medium 104b is input via the user interface 101, and in response to a recording key signal, the video input signal is stored in the storage medium (S302, S303). While the video input signal is being thus stored, a corresponding set of recording item OSD data is configured and stored in the system memory 107 (S304). Here, the recording item OSD data comprises recording item list data (e.g., title information) of at least one recording item and a plurality of sample images extracted in correspondence to the least one recording item, and the thus-generated recording item OSD data, including sample images, is stored in the system memory 107. As an alternative to storage in the system memory 107, the recording item OSD data, and particularly the sample images, may be stored in the storage medium 104b. In any event, the storage of the sample images enables the display of a plurality of thumbnails according to the present invention; that is, thumbnail display is based on separately stored video data. Complete recording item list data may be generated by receiving information of a (broadcast) program together with the video input signal information, including program identification information such a title information, and determining a termination (start or end) point of the received program. That is, the steps S303 and S304 may be repeated for each program of the video input signal (S305). In the extraction process of the step S304, for a video input signal comprised of I/Q frames, thumbnails are extracted from the I-frame as the signal is stored in the storage medium 104b.

It should be appreciated that the generation and storage of a recording item list as above may be performed with respect to recorded material already stored in the storage medium 104b and available for playback. That is, the above process may be performed in conjunction with a recording item list mode for enabling a playback operation, for example, as part of an initial step of selecting a recording item for playback. In this case, the video input signal of the display device is in effect being supplied from the storage medium 104b, which may be an externally disposed or remotely accessible storage device. In any event, recording item OSD data configured and stored in accordance with FIG. 3 corresponds to at least one recording item of a recording item list and may comprise such OSD data for all recorded material available to a display device according to the present invention.

Figure 4:
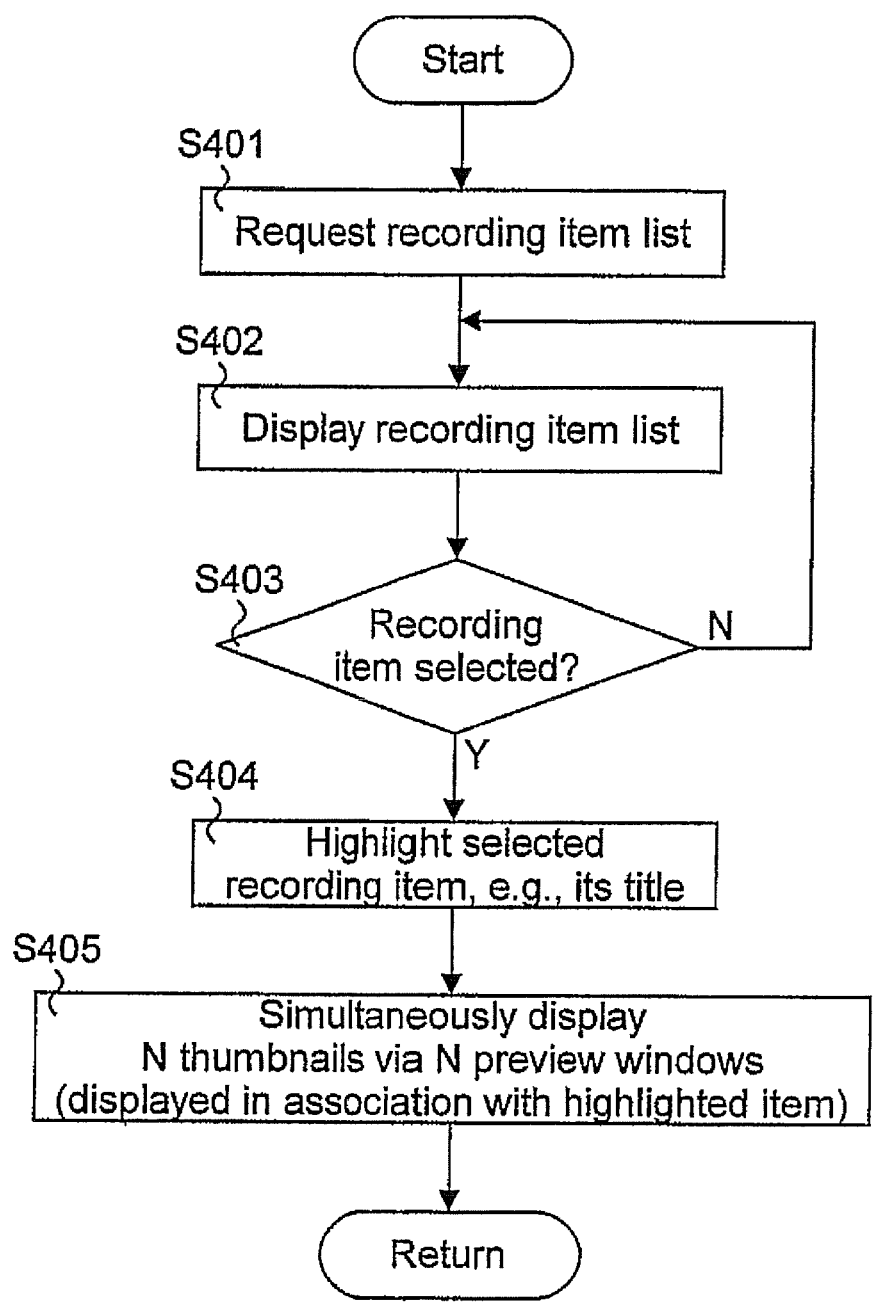
FIG. 4 is a flowchart of a routine for displaying selected recorded material on a recording item list of a display device according to the present invention.

Referring to FIG. 4, illustrating the display of a selection from a recording item list, the system programming of the PVR controller 103 determines whether a recording item list key signal is input via the user interface 101, and in response to a recording item list key signal, the recording item list mode is entered to display a current recording item list (S401, S402). Each displayed recording item of the list includes at least one identifying feature of the recorded material, for example, a corresponding title, but may also include one or more of a representative image or specialized icon for the recording and its recording length, time, source, etc. If a user selects a specific recording item from the displayed recording item list, the selected item is highlighted (S403, S404). In the absence of any specific recording item selection by the user, the highlighted item may revert to a default condition designating, for example, the latest recorded material.

In response to a user selection or highlighting of a specific recording item from a displayed recording item list, i.e., in the recording item list mode, a number (N) of preview windows are simultaneously generated to be displayed in association with the selected recording item, and in each preview window, a corresponding sample image is displayed (S405).

Thus, N thumbnails are simultaneously displayed via N preview windows, such that all the thumbnails are displayed in association with the highlighted item and its at least one identifying feature, e.g., its title. The sample images may include any combination of one or more of a thumbnail, a moving picture, or a still image (screen shot). For example, a series of thumbnails may be appear in the plurality of preview windows, respectively, in correspondence to N intervals of a size (period) determined by an equal division of the recording length of the recorded material. If the sample image is a thumbnail, the thumbnail substantially corresponds to a moving picture or video segment of, say, ten seconds in length, and is in essence a representative image of the moving picture, in which its final scene may appear, and perhaps remain displayed, in the preview window after the video segment has run its length. If the sample image is a moving picture, the moving picture substantially corresponds to a video segment of one interval, such that the recorded material may be fully represented by a simultaneous display of all N sample images via the N preview windows. If the sample image is a still image, a corresponding still image, e.g., an initial frame, of each interval is displayed in each preview window.

Various combinations of the above sample images to be displayed may be devised. For instance, a plurality of still images corresponding to one displayed sample image, such as a thumbnail, may be stored in the system memory 107 (or the storage medium 104b) to enable a selective display of the plurality of stored still images in response to a designation of a specific preview window. Then, at least one still image may be further stored in response to a user selection of at least one of the displayed still images, so that recorded material (video content) may be reproduced from a recording position corresponding to the thus selected at least one still image.

The number (N) of extracted thumbnails, and in turn the count of the preview windows, may be determined in advance by a manufacturer of the display apparatus or may be set and subsequently edited, as desired, by the user. The preview window count may be set, by the manufacturer or by the user, according to a default condition or based on the size (recording length) of the corresponding recording item. Thereafter, to edit the preview window count after selection of a specific recording item as in the steps S403 and 5404, the current count may be displayed in a count window 106b enabling a user selection of the preview window count, which determines the number of intervals (equal divisions) of the recorded material. In the absence of a user selection of a specific count, the system programming equally divides the selected recorded material by a default value count. Further, in the absence of any selection of a specific thumbnail of a displayed array of thumbnails, i.e., after recording item highlighting but before playback execution, the N preview windows may each be popped up in turn (one by one) according to an automatic "revolving" thumbnail display cycling through all N thumbnails.

Figure 5:
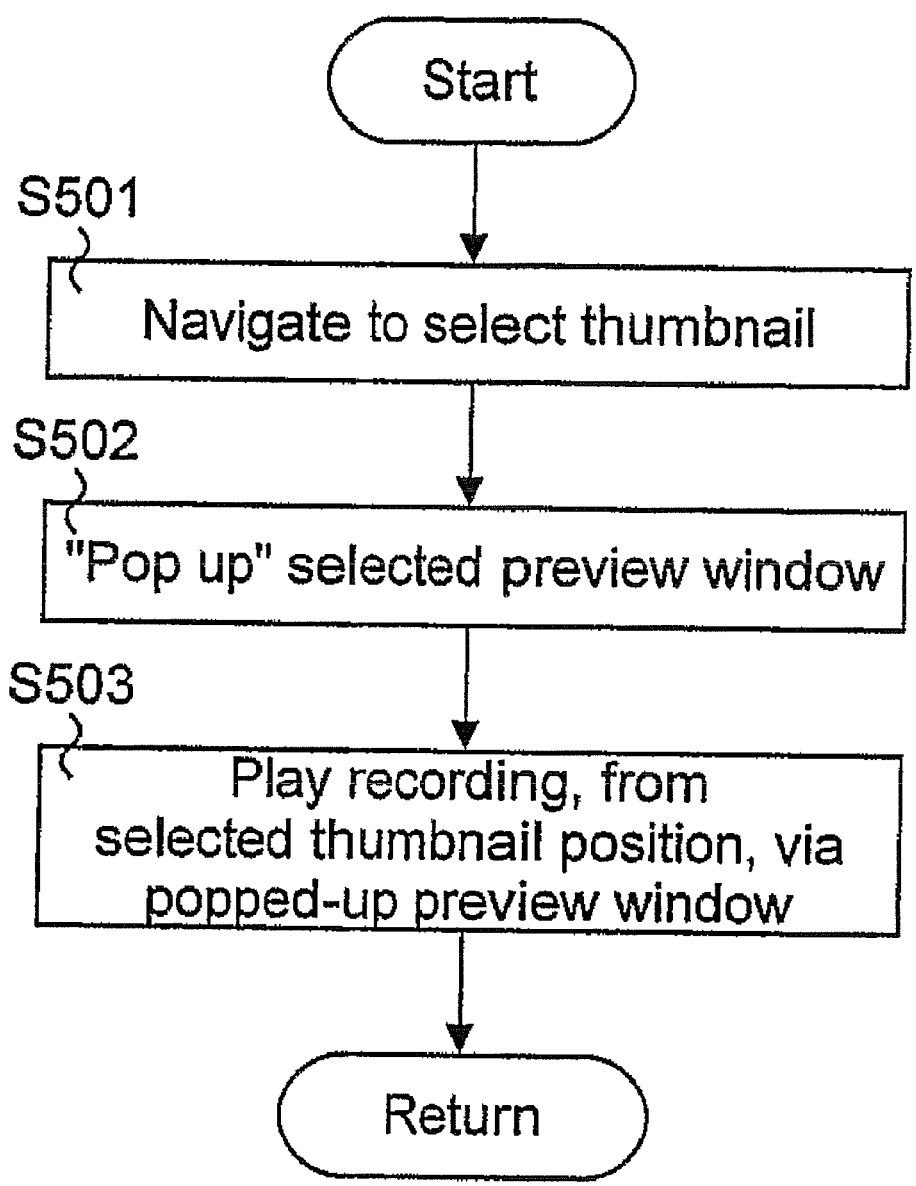
FIG. 5 is a flowchart of a routine for selecting a displayed thumbnail to operate a display device according to the present invention.

Referring to FIG. 5, illustrating the selection of a displayed thumbnail, the user is able to navigate a screen indicator between the displayed thumbnails by manipulating the user interface 101, and in doing so, it is determined whether the indicator specifies one of the thumbnails (S501). If the indicator thus selects a specific thumbnail, a preview window for the selected thumbnail is "popped up"; that is, the display size (dimensions) of the corresponding preview window is temporarily enlarged (S502). The selected recorded material is played from a recording position corresponding to the selected sample image (S503). Here, selection of a specific thumbnail may be achieved by hovering the indicator for a prescribed time, as in a mouse-over maneuver with respect to a target thumbnail, or by a standard clicking or curser-highlighting action. If a user mouses-over a series of thumbnails, for example by slowly tracing the indicator to follow a row or column of preview windows, each preview window of the series will be popped up in turn. The enlarged size of the popped-up preview window, which may be selectively set, may range from slightly larger than the non-popped-up windows (as in FIG. 2) to a full screen size that temporarily replaces the entire OSD menu.

Figure 6:
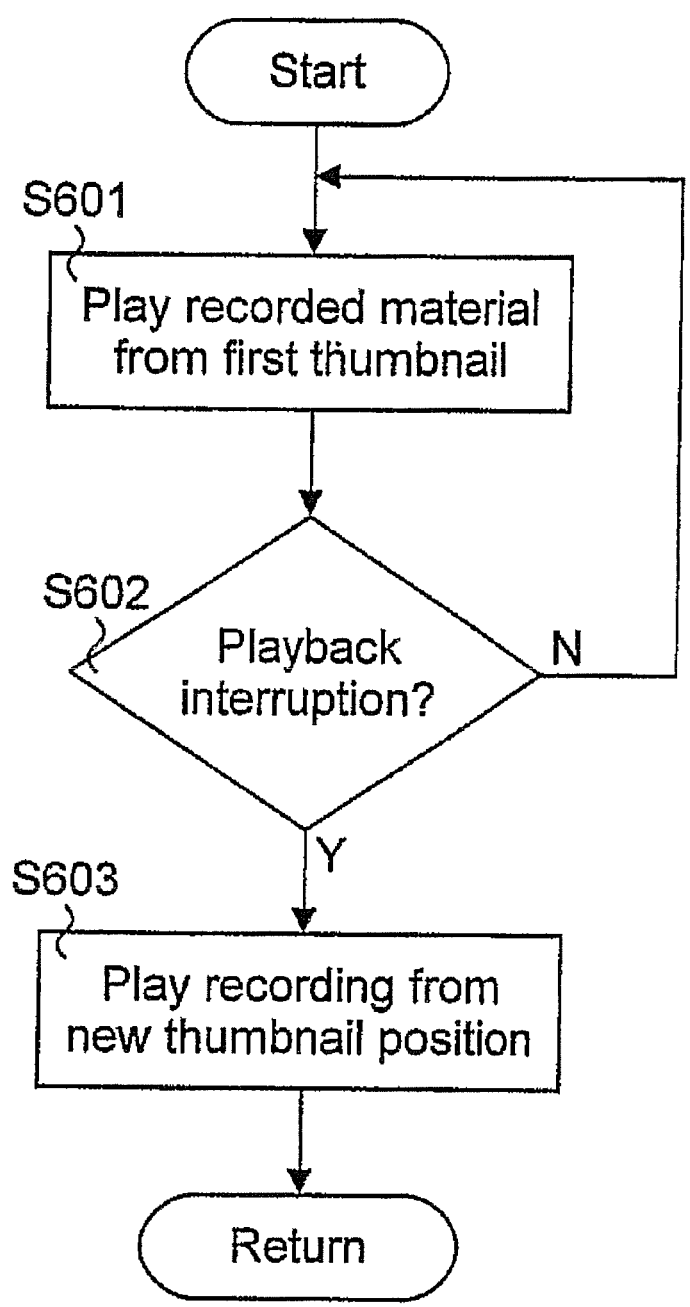
FIG. 6 is a flowchart of a routine executed in the event of an interrupted playback of recorded material in a display device according to the present invention.

FIG. 6 illustrates a routine of the present invention, whereby in the event of an interrupted playback of recorded material, particularly through a manipulation of the screen indicator, similar to the position indicator of a conventional progress bar. Here, however, the indicator may be a varied user selection (pointer, curser, etc.) with respect to a displayed array of thumbnails as in FIG. 2, such that this routine is in essence continuously executed while such an indicator is being navigated by the user. In FIG. 6, corresponding recorded material is played from a first thumbnail selected from among a row (or column) of thumbnails simultaneously displayed via the respective preview windows (S601). It is then determined whether there occurs an interruption attributed to navigation of the indicator (S602). Playback interruption may be determined in cases where it is determined that the indicator is specifying a new (second) thumbnail in the same manner as described in relation to FIG. 5. If it is determined that playback has been thus interrupted, the recording item is reproduced from the new thumbnail position (S603).

Figure 7:
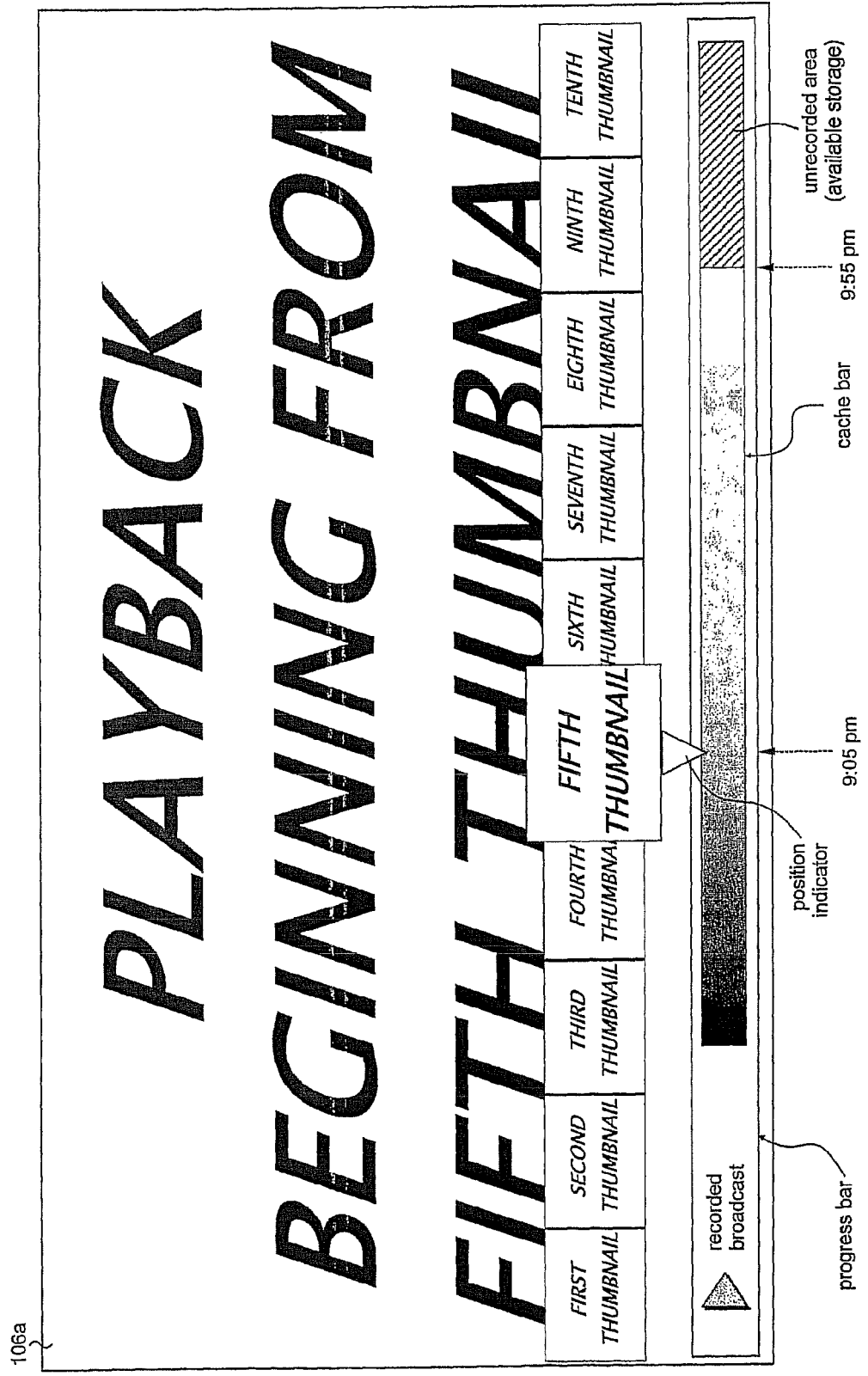
FIG. 7 is a diagram of an exemplary screen image in which a plurality of thumbnails is displayed in conjunction with a time-shift function of a display device according to the present invention.

FIG. 7 illustrates an exemplary screen displaying a plurality of thumbnails having a predetermined time interval to indicate an overall flow of recorded material in accordance with a time-shift function being executed using the displayed thumbnails. As shown in FIG. 7, if a user selects a time-shift function of the display device, a progress bar, including a cache bar and a position indicator, is displayed using OSD data, which may be superposed on a currently viewed video input signal, e.g., a broadcast program. In accordance with the time-shift function, a recently viewed portion of the broadcast program is temporarily stored in a time-shift storage area, for example, in the storage medium 104b, enabling time-shifting of a received video signal. The color of the displayed cache bar may be varied in direct correspondence to the video signal's storage.

Thus, as shown in FIG. 7, according to the present invention applied to a display device having a time-shift function, a plurality of thumbnails is simultaneously displayed with a predetermined time interval in association with a progress bar. Hence, by considering the thumbnails displayed per section on the progress bar, a user is able to recognize the contents and status of broadcast program(s) stored in the time-shift storage area. Also, the user is able to play corresponding recorded material from a specific recording position that may be gauged with respect to the progress bar. For instance, if the user selects the fifth thumbnail, for example by a mouse-over of the fifth preview window, the time-shifted video signal display of the screen 106a corresponds to a playback from the fifth thumbnail.

Therefore, according to the present invention, a recording item of a recording item list is selected to display a plurality of corresponding thumbnails via a corresponding number of preview windows, which may be set by the user. The plurality of thumbnails are extracted in accordance with a predetermined time interval and displayed together on a screen, which enables a user to recognize at a glance the overall contents of each item of a recording item list. Then, the user may navigate to highlight any one of the preview windows, whereupon the highlighted preview window is popped up and displays the recorded material from a corresponding position of the selected recording item, after which the user may execute a playback operation to reproduce the recorded material from the desired position. If so, the corresponding recorded material is played from the currently highlighted preview window to an end of the recorded material.

INDUSTRIAL APPLICABILITY

By adopting the present invention, a user is able to recognize the overall contents of recorded material selected by the user. In particular, the user is able to recognize the overall contents of a specific recording item, prior to playing back the recorded material and without playing to view the selected recorded material entirely, without using a bookmark function of a progress bar. With corresponding time information displayed above each thumbnail, a running time can be predicted with respect to a specific recording position. The present invention is nevertheless applicable to a display device provided with a general time-shift function.

Thus, the present invention provides a method of displaying recorded material and a display apparatus using the same, which facilitates user recognition of the contents of selected recorded material prior to its reproduction, as well as user recognition of the contents of all recorded material available for reproduction, so that the recognition and designation for playback of a specific recording position of recorded material selected by a user.

Furthermore, as described above, the storage medium employed by the display device according to the present invention may be externally or even remotely disposed, and the extraction and storage of the plurality of sample images for simultaneous display respectively via a corresponding plurality of preview windows according to the present invention may be performed in response to an arbitrary user selection from a displayed recording item list, that is, after completion of a corresponding recording operation. As such, the corresponding recording operation may have been performed, at some earlier time, by a party or operator unknown to the primary (or instant) user. Therefore, the present invention is applicable in cases where the user has not performed any recording operation, or where the user is otherwise unaware of the extent or currently availability of the recorded material, and in cases where new or existing content may be updated or changed regularly as through an Internet-based storage device or video service, that is, a storage medium maintained by others to include video content wholly unknown to the user.

The present invention is also applicable to photo series and to separate video-recorded material including digital interne video express (DIVX) and universal serial bus (USB) video recorded materials. In the case of a photo series, each photo (i.e., recording item) includes a title and a size. A USB or DIVX recording item can include the same information as a moving picture recording item.

While the present invention has been described and illustrated herein with reference to one or more preferred embodiments, it will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:

1. A device capable of displaying at least one moving picture, comprising:
    a display unit;
    a video recorder unit configured to record a video;
    a memory configured to store the recorded video;
    a controller configured to:
    generate a plurality of moving pictures from the recorded video, the plurality of moving pictures including first, second and third moving pictures, the first moving picture being a first video of first duration of time, the second moving picture being a second video of a second duration of time, and the third moving picture being a third video of a third duration of time,
    store the generated plurality of moving pictures in the memory, and
    play back the first, second and third moving pictures,
    wherein the first, second and third played-back moving pictures corresponding to the same video recorded by the video recorder unit are concurrently displayed on the display unit,
    wherein in response to selecting the second played-back moving picture among the first, second and third played-back moving pictures by locating an indicator on the second played-back moving picture for a prescribed time, the second played-back moving picture is enlarged compared to the first and third played-back moving pictures such that the enlarged second played-back moving picture partially overlaps the first and third played-back moving pictures, and
    wherein prior to selecting the second played-back moving picture, the first, second and third moving pictures are concurrently displayed and are played-back for less than a full length of the first, second and third moving pictures.

2. The device of claim 1, wherein the indicator is moved to the second moving picture in response to control of an input device to hover over the second moving picture.

3. The device of claim 1, wherein each moving picture is enlarged one by one in series in response to the indicator tracing over a series of the first, second and third moving pictures.

4. The device of claim 1, wherein in response to selecting the second played-back moving picture, the second played-back moving picture is enlarged in a first enlarged state.

5. The device of claim 4, wherein in response to activating the second played-back moving picture, the second played-back moving picture is played back to its end of the second duration of time in a second enlarged state, the second enlarged state being greater in size than the first enlarged state.

6. The device of claim 1, wherein the first and third moving pictures are played back behind the enlarged second moving picture while the second moving picture is played back.

7. The device of claim 1, wherein the first, second and third moving pictures are displayed together without being overlapped with one another before the indicator is provided over any of the first, second and third moving pictures.

8. The device of claim 7, wherein non-overlapped moving pictures are displayed in the same size.

9. The device of claim 1, wherein a scroll bar is displayed on the display unit, when the plurality of moving pictures are arrayed to be extended beyond a breadth of the display unit.

10. The device of claim 1, wherein the plurality of moving pictures are identified by an identifier.

11. The device of claim 10, wherein the identifier includes time information of the corresponding moving picture.

12. The device of claim 1, wherein each of the first, second and third moving pictures is displayed in the same size prior to enlargement of the second moving picture.

13. The device of claim 1, wherein the recorded video is a broadcast video of a program recorded during a prescribed period of time.

14. The device of claim 13, wherein a list of other programs recorded is provided on the display unit.

15. The device of claim 1, wherein the first, second and third moving pictures are displayed within first, second and third preview areas, respectively.

16. A device capable of displaying a moving picture, comprising:
a display unit;
a memory configured to store at least three moving pictures, including first, second and third moving pictures, the first moving picture being a first video of first duration of time, the second moving picture being a second video of a second duration of time, and the third moving picture being a third video of a third duration of time, wherein the first, second and third durations of time are same durations of time; and
a controller configured to play back the first, second and third moving pictures,
wherein the first, second and third played-back moving pictures are concurrently displayed without being overlapped with one another on the display unit, and
wherein in response to selecting the second played-back moving picture among the first, second and third played-back moving pictures by locating an indicator on the second played-back moving picture for a prescribed time, the second played-back moving picture is enlarged compared to the first and third played-back moving pictures such that the enlarged second played-back moving picture partially hides the first and third played-back moving pictures,
wherein prior to selecting the second played-back moving picture, the first, second and third moving pictures are concurrently displayed and are played-back for less than a full length of the first, second and third moving pictures, and
wherein after the second moving picture selected by the indictor partially hides the first and third moving pictures, the second moving picture selected by the indicator is configured to played back to its end of the second duration of time in an enlarged state.

17. A method of displaying at least one moving picture in a device, the method comprising:
recording a video using a video recorder unit of the device;
storing the recorded video in a memory of the device;
generating a plurality of moving pictures from the recorded video, the plurality of moving pictures including first, second and third moving pictures, the first moving picture being a first video of first duration of time, the second moving picture being a second video of a second duration of time, and the third moving picture being a third video of a third duration of time,
storing the generated plurality of moving pictures in the memory, and
playing back the first, second and third moving pictures,
wherein the first, second and third played-back moving pictures corresponding to the same video recorded by the video recorder unit are concurrently displayed on a display unit of the device,
wherein in response to selecting the second played-back moving picture among the first, second and third played-back moving pictures by locating an indicator on the second played-back moving picture for a prescribed time, the second played-back moving picture is enlarged compared to the first and third played-back moving pictures such that the enlarged second played-back moving picture partially overlaps the first and third played-back moving pictures, and
wherein prior to selecting the second played-back moving picture, the first, second and third moving pictures are concurrently displayed and are played-back for less than a full length of the first, second and third moving pictures.

18. A method of displaying a moving picture in a device, the method comprising:
storing at least three moving pictures including first, second and third moving pictures, the first moving picture being a first video of first duration of time, the second moving picture being a second video of a second duration of time, and the third moving picture being a third video of a third duration of time, wherein the first, second and third durations of time are same durations of time; and
playing back the first, second and third moving pictures,
wherein the first, second and third played-back moving pictures are concurrently displayed without being overlapped with one another on a display unit of the device, and
wherein in response to selecting the second played-back moving picture among the first, second and third played-back moving pictures by locating an indicator on the second played-back moving picture for a prescribed time, the second played-back moving picture is enlarged compared to the first and third played-back moving pictures such that the enlarged second played-back moving picture partially hides the first and third played-back moving pictures,
wherein prior to selecting the second played-back moving picture, the first, second and third moving pictures are concurrently displayed and are played-back for less than a full length of the first, second and third moving pictures, and wherein after the second moving picture selected by the indictor partially hides the first and third moving pictures, the second moving picture selected by the indicator is configured to played back to its end of the second duration of time in an enlarged state.

\* \* \* \* \*